INVENTOR
WILLIAM H. BURKHART
BY George H. Lorch
ATTORNEY

Feb. 3, 1959 W. H. BURKHART 2,872,107

ELECTRONIC COMPUTER

Filed May 16, 1951 4 Sheets-Sheet 2

Inventor
WILLIAM H. BURKHART
George H. Lorch
Attorney

Feb. 3, 1959 W. H. BURKHART 2,872,107

ELECTRONIC COMPUTER

Filed May 16, 1951

4 Sheets-Sheet 3

Inventor

WILLIAM H. BURKHART

George H. Lasch

Attorney

Feb. 3, 1959 W. H. BURKHART 2,872,107

ELECTRONIC COMPUTER

Filed May 16, 1951 4 Sheets-Sheet 4

INVENTOR
WILLIAM H. BURKHART
George H. Lorch
ATTORNEY

United States Patent Office 2,872,107
Patented Feb. 3, 1959

2,872,107

ELECTRONIC COMPUTER

William H. Burkhart, East Orange, N. J., assignor to Monroe Calculating Machine Company, Orange, N. J., a corporation of Delaware Application May 16, 1951, Serial No. 226,700
12 Claims. (Cl. 235—61)

Figure 1:
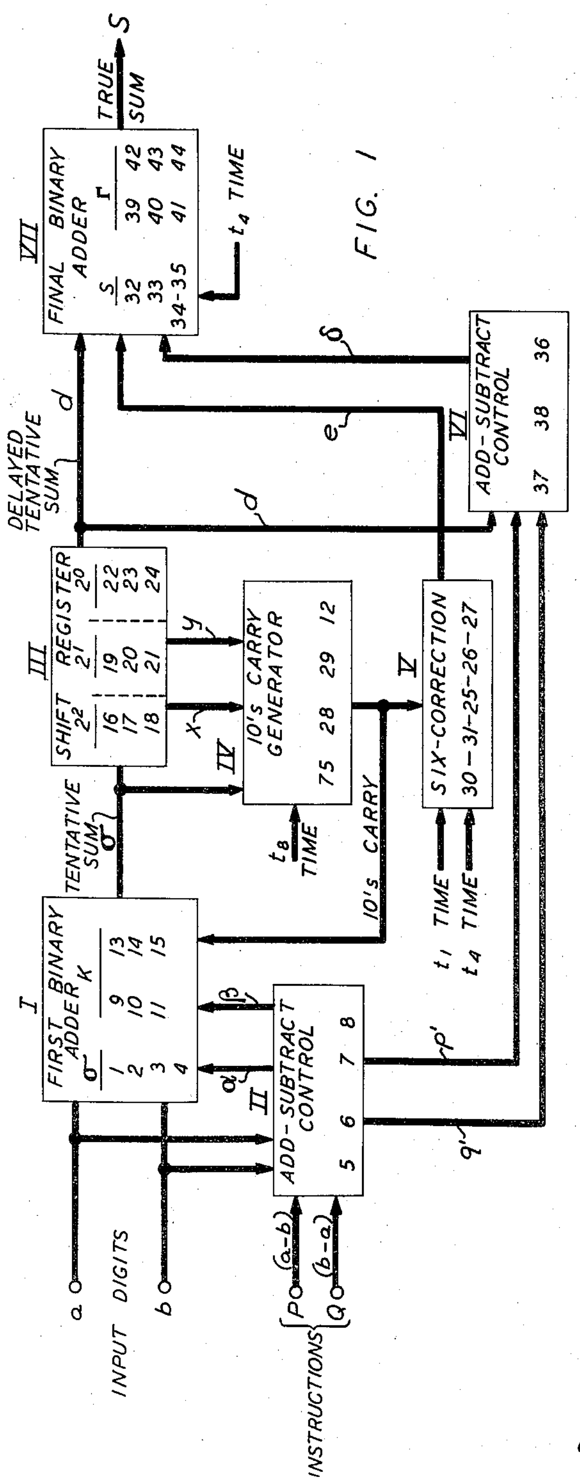

This invention relates to electronic adding and subtracting machines. In the field of electronic computers there are many types. In some, the different orders of digits are entered simultaneously. In others they are entered serially. The serially operated computers require more time but less equipment for delivery of the computed results. My invention is of the serially operated type.

In a digital computer of well known type the input quantities, the computations and the results are all expressed in binary numbers without any reference to decimal equivalents. For ease of interpretation of the work performed by a computer, a decimal digit representation of numbers dealt with seems to have a considerable advantage. Therefore I have adopted a system in which each decimal digit is represented by a 4-place binary number. The progressive orders of such a number are frequently referred to as $2^0$, $2^1$, $2^2$, $2^3$. When the highest order digit is placed at the left the binary digit expression has the significance of the decimal numbers 8, 4, 2, 1. Hence, any signal decimal digit is readily expressed as a 4-place binary number.

In carrying out my invention I have adopted a novel method of dealing with the carry requirements of a computation so that when final results are obtained, all 4-place binary digit numbers will be direct representations of decimal digits.

The input signals are in the form of periodic pulses having one value, say a negative voltage, to represent digit 0 and another value, say ground potential, to represent digit 1. The pulses are introduced into the computer preferably at a fixed cadence. All gating operations in the computer conform to that cadence. Considerable variation of the pulse rate is permissible, however, so long as the signal input rate and the gating pulses are synchronized. If, for example, the pulses are derived from the playback of a magnetic record on a drum, the speed of the drum and the spacing of the spot records on a recording track will determine the cadence. When a magnetic drum is used as the source of information, it is essential that a synchronized pulse channel be used for gating the pulses out of the playback amplifier and into the computer.

It is an object of this invention to provide an electronic computer having stages for serial addition or subtraction of ascending orders of digits of two numbers.

A second object is to provide an electronic machine which will accept a serial presentation of two numbers expressed in 4-place binary equivalents of decimal digits and will deliver computed sums or differences which are also expressed in 4-place binary equivalents of decimal digits, all necessary carry operations being so performed that each of the 4-place binary numbers has a value no greater than 9.

A third object is to provide a device of the character indicated above wherein successive steps of a calculation may be performed at a cadence commensurate with conventional high speed electronic computer performance and with a minimum of lost time due to the conversion of 4-place binary numbers, the decimal equivalents of which would be greater than 9.

A fourth object is to provide a circuit arrangement for adjustment of tentative computations expressed in 4-place binary number equivalents of decimal digits so that, after necessary carry operations, no 4-place binary number shall have a value greater than 9.

A fifth object is to provide temporary storage equipment, such as a shift register, into which a signal train may be introduced, each successive pulse representating a binary digit. The temporary storage of three such digits can then be referred to at a given instant for determining whether or not a tens carry requirement exists.

Other objects will be expressed in, or inferred from, the description to follow.

Figure 2:
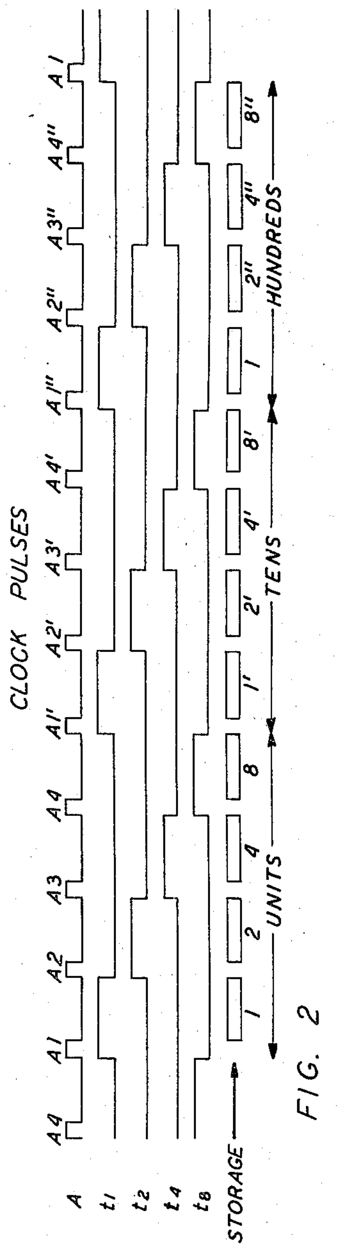
Figure 3:
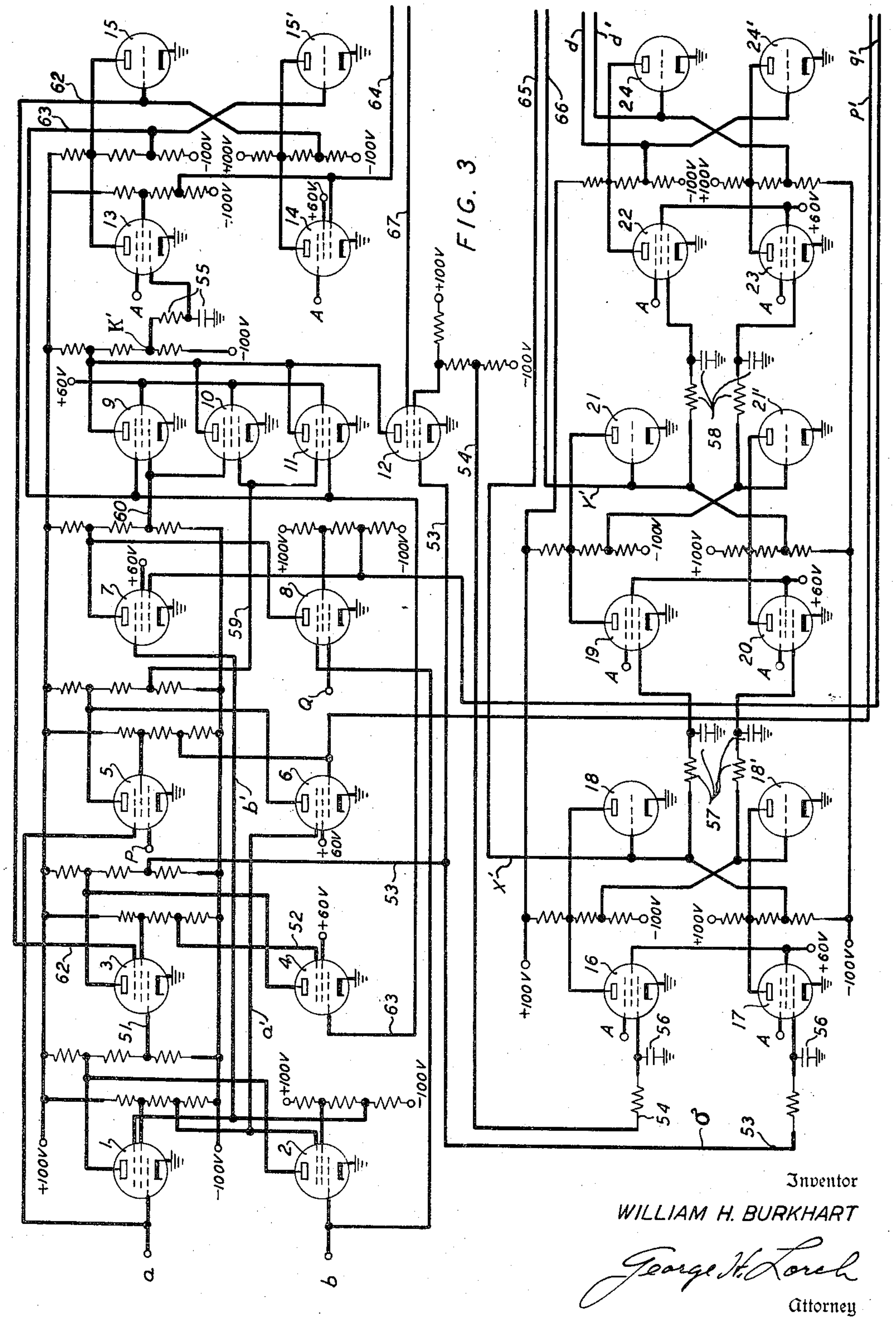
Figure 4:
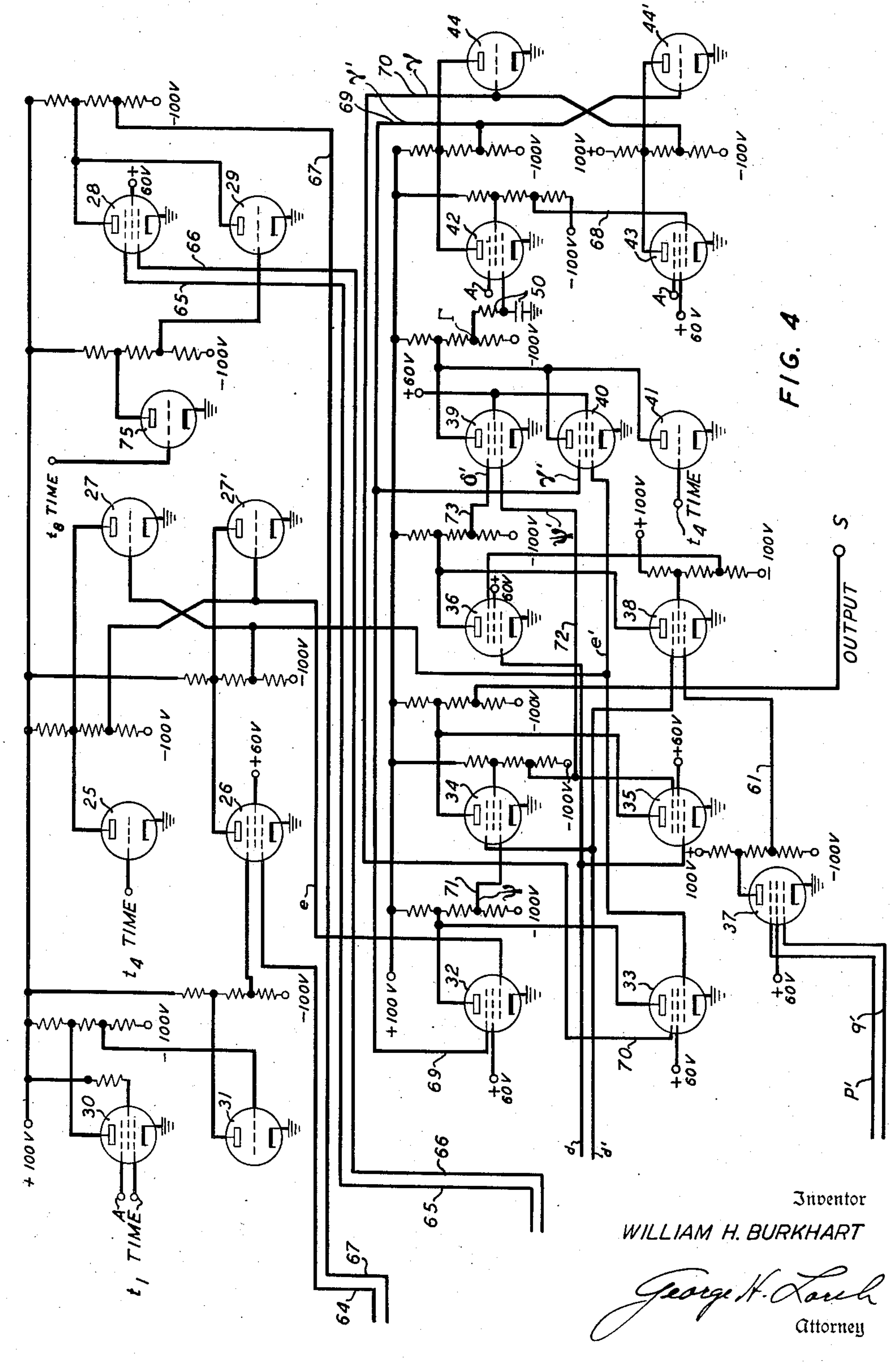
Figure 5:
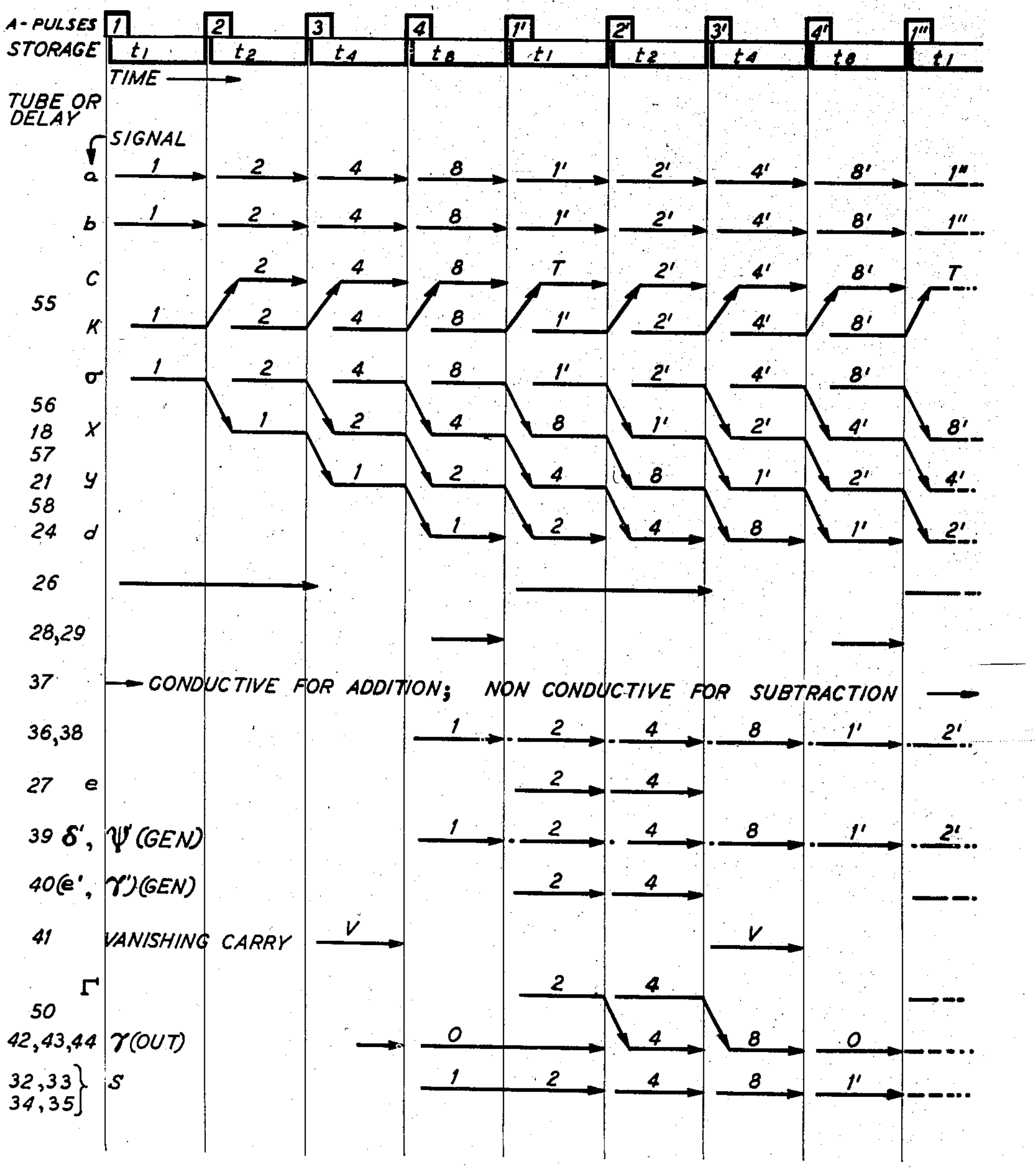

The invention will now be described in more detail, reference being made to the accompanying drawings in which Fig. 1 is a functional diagram showing groups of essential components of a serial add-subtract computer which operates on the principles indicated above;

Fig. 2 shows a timing diagram for the performance of digital operations in serial order;

Figs. 3 and 4 when placed together, end to end, show a more complete circuit diagram comprising the essential components of this computer, and Fig. 5 is a timing chart.

*The grouping of components according to their functions*

The complete circuit arrangement of Figs. 3 and 4 will be best understood by first explaining the functions of various groups of components as shown in Fig. 1. Group I is called the First Binary Adder. Tubes 1, 2, 3 and 4 are used to integrate two simultaneously presented digits $a$ and $b$ and a possible carry-in digit $c$, all of like order. The output signals are labeled $\sigma$. Group I also includes tubes 9, 10, 11, 13, 14 and 15 which cooperate to generate and store an outgoing carry signal labeled K. Digits of like order are presented simultaneously, while digits of ascending orders are fed into the computer successively. Each decimal digit is represented by a 4-place binary number, the digits of which are also presented in ascending order.

The component group II as shown in Fig. 1 has the function of instructing a computer how to operate. There are three modes of operation. If a computation is to be $(a-b)$, a signal "P" is applied so that $b$ will be subtracted from $a$. If the instructions are to subtract $a$ from $b$ then a pulse "Q" is applied from a separate circuit. If we are to compute $(a+b)$, then the summation will be automatically obtained in the absence of the two subtract signals "P" and "Q." For addition, therefore, signals "$p'$" and "$q'$" are simultaneously derived as inversions of "P" and "Q," and are utilized in an add-subtract control group VI, comprising tubes 36, 37 and 38.

Component group III is a Shift Register with gating tubes and storage flip-flops. This group comprises tubes 16 to 24 inclusive.

Component group IV has the function of generating tens carries which are incidental to the testing of tentative sums to distinguish between those which are of lesser value than decimal ten, and those which are equal to or greater than ten. In the latter case a tens carry is generated. Group IV comprises tubes 75, 28, 29 and 12.

Component group V is labeled Six-Correction and comprises tubes 30, 31, 25, 26 and 27. Their function is to generate a correction signal $e$ representing the decimal digit 6 whenever a tens carry occurs.

The Final Binary Adder, group VII, is structurally and functionally similar to the First Binary Adder. This group comprises tubes 32 to 35 inclusive which are used to obtain a final integration of tentative sums with the correction (when required) and with further carries, if any. Tubes 39 to 44 inclusive are also of this group and are used for the derivation and temporary storage of further incidental carries.

*The sequence of operations*

It is important to consider the delays which are purposely introduced at various parts of the circuit arrangement and also the utilization of clock pulses for gating requirements. Fig. 2 is referred to in this connection.

When information is delivered to the computer in serial fashion and digits of like denominational order are simultaneously presented, it is necessary to provide a holdover of carry requirements from the time that digits of one binary denomination have been integrated until digits of the next higher order are entered.

The clock pulses A, as shown in Fig. 2, may be generated in any suitable manner, occurring necessarily at the same cadence as that of the entering digit pulses. On the line A of Fig. 2, the positive pulses are labeled A1, A2, A3 and A4 merely to indicate the gating times for transferring successive ones of four binary digits of a decimal number representation out of one storage unit and into another. For this purpose the A-pulses are applied simultaneously to the suppressor grids of tubes 13, 14, 16, 17, 19, 20, 22, 23, 42 and 43 (Figs. 3 and 4). Clock pulse A1 is given at the start of input signals for binary digit 1 as applied to terminals *a* and *b*.

The tubes just mentioned serve to gate the delayed signals into temporary storage as provided by flip-flop stages. A signal representing a carry requirement as derived from one digit order is made effective in the summation process of the next higher digit order by virtue of the fact that the gating pulse just bridges the gap between two storage periods. So the delayed signal is transferred to the succeeding flip-flop stage by the gate tube at the instant of the A-pulse application and is held in storage during the time interval represented by one of the blocks on the line labeled "Storage." There are the following delay circuits to be found in Figs. 3 and 4:

| Delay Circuit | Input to Tubes | Storage in Flip-Flop |
|---|---|---|
| 55 | 13 | 15—15′ |
| 56 | 16—17 | 18—18′ |
| 57 | 19—20 | 21—21′ |
| 58 | 22—23 | 24—24′ |
| 50 | 42 | 44—44′ |

*The shift register*

Tens carries are those which involve a transfer from one to another of the 4-place binary groups. In one of these groups the lowest order digit $2^0$ has no significance for tens carry determination, although it is the first digit to be entered into the shift register and the first to be gated out therefrom. Digits $2^3$, $2^2$, $2^1$ must be presented simultaneously to the fourth switching group for showing whether or not the integrated sum is equal to or greater than 10. The test is made after the binary digits $2^3$ have been applied to terminals *a* and *b* and lower order digits have become stored in flip-flop stages as follows:

| Binary digits | $2^2$ | $2^1$ | $2^0$ |
|---|---|---|---|
| Flip-flop stages | 18—18′ | 21—21′ | 24—24′ |

If there is a tens carry requirement, it will be shown by the fact that the sum of the three digits $2^3$, $2^2$, and $2^1$ is equal to or greater than 10. The means for sensing this fact will be expained in due course.

The timing diagram of Fig. 2 has been briefly described in the above given chapter on "The sequence of operations." The plateaus on graph $t_1$ represent the times when signals for $2^0$ are applied to terminals *a* and *b*. At these times the $2^0$ digits are integrated. Pulse A2 gates that integration into the storage flip-flop 18—18′ of the shift register. Pulse A3 gates the integration of $2^1$ digits into storage flip-flop 18—18′ and the $2^0$ digit is at the same time transferred by tube 19 or 20 to the storage flip-flop 21—21′. Pulse A4 gates the integration of the $2^2$ digits into storage flip-flop 18—18′, and simultaneously causes two transfers wherein (1) the $2^0$ digit is gated from storage flip-flop 21—21′ through tube 22 or 23 to thee storage flip-flop 24—24′ and (2) the $2^1$ digit is gated from flip-flop 18—18′ through tube 19 or 20 to the storage flip-flop 21—21′. The flip-flop tubes retain the stored signals each during a time interval commensurate with one of the blocks shown on the line labeled "Storage."

*The theory of carry operations*

The table shown below serves to illustrate by an example of addition and another example of subtraction how carry-out requirements are met and how carry-in signals are utilized. In the column headed "Decimal Notation" the decimal equivalents of binary numbers are given in a line-for-line manner. Beneath the heading "Sum" are two columns of 4-place binary numbers, they being representative of decimal tens and units respectively. Beneath the heading "Carry" are two supplemental columns of 4-place binary numbers, the explanation of which will follow the table.

| Decimal Notation | | Legend | | Sum Tens | Sum Units | Carry Tens | Carry Units | |
|---|---|---|---|---|---|---|---|---|
| **Addition** | | | | | | | | |
| +40 | + 7 | Augend | (*a*) | 0100 | 0111 | 0100 | 0111 | 47 |
| +20 | + 5 | Addend | (*b*) | 0010 | 0101 | 0010 | 0101 | 25 |
| +10 | | Carry in | (*c*) | 000T | 111 | 000T | 111 | Carry in (*c*) |
| +70 | (+12) (−16) | Tentative Sum | (σ) | 0111 | 1100 | 0000 | T111 | Carry out (K) |
| +70 | (− 4) | Tentative Sum | (*d*) | 0111 | 1100 | 0111 | 1100 | Tentative Sum |
| | + 6 | Correction | (*e*) | 0000 | 0110 | 0000 | 0110 | Correction (*e*) |
| | | Carry in | (γ) | 000V | 100 | 000V | 100 | Carry in (γ) |
| +70 | + 2 | True Sum | (S) | 0111 | 0010 | 0000 | V100 | Carry out (Γ) |
| **Subtraction** | | | | | | | | |
| +70 | + 3 | Minuend | (*a*) | 0111 | 0011 | 1000 | 1100 | Inversion of 73 |
| −10 | − 8 | Subtrahend | (*b*) | 0001 | 1000 | 0001 | 1000 | 18 |
| −10 | +16 | Carry in | (*c*) | 001T | 0000 | 001T | 000 | Carry in |
| +50 | +11 | Tentative Difference | (σ) | 0101 | 1011 | 0001 | T000 | Carry out |
| +50 | +11 | Tent. Dif. | (*d*) | 0101 | 1011 | 1010 | 0100 | Inversion of *d* |
| | − 6 | Correction | (*e*) | 0000 | 0110 | 0000 | 0110 | Correction |
| | | Carry in | (γ) | 0000 | 100 | 0000 | 100 | Carry in (γ) |
| +50 | + 5 | True Dif. | (S) | 0101 | 0101 | 0000 | 0100 | Carry out (Γ) |

In the "First Binary Adder" (group I of Fig. 1) ascending orders of binary digits $a$ are integrated with like order digits $b$, and, where appropriate, with carry-in digits $c$ to form a tentative $\sigma$. The integration of two or more 1's in any order effects generation of a carry-out digit $k$ which, after being delayed one pulse time, becomes a carry-in digit $c$ for the next higher binary order. In the table, the ascending order of digits is from the right, and in the "Carry" columns each carry-in digit $c$ is shown one space above and to the left of the carry-out digit $k$ from which it stems and the latter is aligned with the digits $a$ and $b$ which effected generation thereof. In the "Sum" columns of the table, the carry in digits $c$ are aligned with the digits $a$ and $b$ with which they are to be added to produce the tentative sum $\sigma$.

Inasmuch as each four place binary number represents a decimal digit, the carry-out digit $k$ from the highest order ($2^3$) of the former, serves as a tens carry digit, and is designated by the letter T rather than by a 1 in the above table.

Tens carry digits T are generated in one or the other of two different ways depending on whether the tentative sum $\sigma$ of two binary numbers is greater than nine but less than sixteen, or sixteen or above. Whenever the latter is the case a carry-out digit $k$ is generated on summation of the $2^3$ binary digits $a$ and $b$ and a possible carry-in digit $c$, the same as in the other binary orders, but serves as a tens carry when the appropriate correction is made as presently will be described. However, when the decimal sum of two binary numbers is greater than nine but less than sixteen no carry-out digit $k$ is generated on summation of the $2^3$ binary digits. Here the Shift Register, group III, is called into play to detect the occurrence of any decimal sum within the four place tentative sum $\sigma$ which exceeds nine in value. In these cases, the value of the binary digit $2^0$ is of no significance and it is the sum of the $2^3$, $2^2$, $2^1$ digits that effects a tens carry T at appropriate times. Again, a correction is required to compensate for the difference in carry requirements between the decimal and binary systems of notation.

The delayed tentative sum emerging from the Shift Register is labeled $d$ in the above table. In order to correct this tentative sum, each decimal order thereof from which a tens carry digit T has been extracted, has a correction factor $e$ added thereto in the "Final Binary Adder" (group VII of Fig. 1) with the aid of auxiliary components IV, V and VI. Evidently, the correction factor is six, the difference between ten and sixteen.

As shown in the table, the carry-out digits in the "Final Binary Adder" are labeled $\Gamma$, while the carry-in digits are labeled $\gamma$. Inasmuch as the required tens carries between the decimal orders have already been accomplished as described above, tens carries resulting from carry-out digits $\Gamma$ are suppressed. Suppressed tens carries are indicated by the letter V in the table. In other respects the "Final Binary Adder" functions in the same manner as described above, to produce a sum S which is the integration of $d$, $e$ and $\gamma$. Sum S is the binary coded decimal sum of augend $a$ and addend $b$ for convenience is called the true sum.

In the problem of subtraction as given in the above table, the binary numbers for the minuend are inverted for carry determinations only. The "Tentative Difference" $d$ is also inverted for carry determination purposes. In other respects the computing processes are performed the same as though the problem were one of addition.

*The first summation of binary digits (Binary adder I)*

Two input terminals $a$ and $b$ are shown in Fig. 3, each connected to the first grid of pentode tubes 1 and 2 respectively. For summation purposes where either $(a+b)$, $(a-b)$ or $(b-a)$ is to be computed, the coordination of effects in tubes 1 and 2 will produce either a high or low output potential on conductor 51 as follows:

By the use of voltage dividers connected between the positive and negative terminals of a D. C. source and as shown throughout the circuit diagram of Figs. 3 and 4, it is possible to obtain a certain voltage swing on either the anode or the screen grid of a given tube and to derive useful signals therefrom. When the first grid is biased to cut-off the screen grid potential will be relatively high, and when the first grid potential is at or near ground potential, the screen grid potential will be low. Likewise, when conduction in the tubes is permitted by a positive first grid bias and when at the same time the suppressor grid bias is positive, conduction will be obtained all the way through to the anode so that both anode and suppressor grid potentials will drop. If conduction is stopped at the suppressor grid by a negative bias thereon, the anode potential will remain high.

Consider now the fact that the anodes in tubes 1 and 2 are interconnected. If $(a+b)$ is equivalent to $(1+1)$ then the low screen grid potential in tube 1 produces a negative suppressor grid potential in tube 2 so that the anode in tube 2 does not receive any electrons. Likewise, with conduction in tube 2 as far as the screen grid, a negative bias is applied to the suppressor grid of tube 1. Hence, both tubes 1 and 2 are blocked. Their joined anodes are connected to a voltage divider which has an output conductor 51. For the summation $(1+1)$ conductor 51 is at high potential and the first grid in tube 3 is driven positive. By "positive" or high potential, it is meant here and throughout the specification that the grid bias is not appreciably different from ground potential. By "negative" or low potential, if it refers to a control grid or to a suppressor grid, a blocking bias is meant.

The positive potential on conductor 51 results from the summation of $(0+0)$ as well as the summation of $(1+1)$. Thus, if $(a+b)$ is represented by negative signals on the first grid of tubes 1 and 2 respectively, then the electron streams in these tubes are simultaneously blocked at the first grids and the anode potential is maintained high the same as in the example first given. Tube 3 is conductive at least as far as its screen grid. This screen grid is connected through a voltage divider section to the suppressor grid of pentode tube 4. When tube 3 is driven conductive to its screen grid, tube 4 is cut off for conduction to its anode, regardless of any signals that may be applied to its control grid.

To make a further illustration, let it be assumed that the summation $(a+b)$ is equivalent to $(1+0)$. In this case, tube 1 will be conductive at least as far as its screen grid. Tube 2, however, will be blocked by the negaitve signal $b$ on its first grid. Hence, the high screen grid potential in tube 2 will be reflected in a positive bias on the suppressor grid in tube 1. Tube 1 is therefore now rendered conductive all the way through to its anode and this produces a low potential on conductor 51, so that tube 3 is conductive at least as far as its screen grid.

Results equivalent to those stated in the preceding paragraph are obtained if the summation $(a+b)$ is equivalent to $(0+1)$. In this case, tube 1 is blocked by its negative first grid, thus maintaining its screen potential high. Therefore, the suppressor grid in tube 2 has a high potential, making tube 2 conductive all the way through to its anode, if the signal applied to terminal $b$ is positive, as in the example now considered. The result is to lower the potential on conductor 51 and cause tube 3 to be blocked.

In the above description it has been shown that when $a$ and $b$ are integrated either additively or subtractively, the effect is to produce a high input potenitial on conductor 51 when $a$ equals $b$ and to produce a low potential on conductor 51 when $a$ and $b$ are unequal. This is all that is required for integration of the units digits before carry requirements are taken into consideration, assuming, as in the present embodiment of the invention, that a low potential on conductor 51 must always represent the sum=1.

*Input carries for the summation*

For the first order of decimal digit groups and the lowest binary digit therein, there can be no carry requirements. For higher orders of digits, carries from a lower order may be derived from a previous integration process. Pentode tubes 3 and 4 are used to introduce an incoming carry. Presently it will be shown how the carry requirement is derived; but first its effect upon the control of tubes 3 and 4 will be explained. Tube 4 has its suppressor grid under control of the screen grid potential in tube 3, the interconnection being made through conductor 52. Thus when the integration of $a$ and $b$ produces a high potential on conductor 51, the suppressor grid potential in tube 4 is low and this tube is blocked. Tube 3, however, is rendered responsive to a positive signal on conductor 62. It will presently be shown that this high potential indicates no carry.

The signal potentials on conductors 62 and 63 are always different. That is to say, when the potential is high on conductor 62, it is low on conductor 63 and vice versa. It can now be shown that in the correlation of controls by high and low potentials on conductors 51, 52, 62 and 63, the binary digit input signal which is applied by conductor 51 will be inverted if there is no incoming carry signal and will not be inverted if there is a carry. There are four cases which may be tabulated thus, where X indicates a conductive state and (—) a non-conductive state.

| $a+b+c$ | Conductors | | | | Tubes | | Sum ($\sigma$) |
|---|---|---|---|---|---|---|---|
| | 51 | 52 | 62 | 63 | 3 | 4 | Lead 53 |
| $a=b$ 0 | H | L | H | L | X | — | L |
| $a=b$ 1 | H | L | L | H | — | — | H |
| $a\neq b$ 0 | L | H | H | L | — | — | H |
| $a\neq b$ 1 | L | H | L | H | — | X | L |

It will be apparent from the above table that the output signal on lead 53 is high when $a+b+c$ yields an odd numbered integration of 1's, and is low when there is an even numbered integration of 1's or no 1's. This signal is sometimes indicated by the Greek letter $\sigma$ and refers to the value 1 or 0 in the unit's place of an integration. The inversion of potential of $\sigma$ is represented by $\sigma'$. That is, if $\sigma$ is high (H) then $\sigma'$ is low (L).

*The instruction-giving tube circuit (second switching group)*

Before outgoing carry requirements can be determined, the computer must be directed either to add or to subtract and when subtracting whether to subtract $b$ from $a$ or $a$ from $b$. It is unnecessary to discuss here how these instructions are to be originated and transmitted to the computer. Even by manual switching it is possible to apply a positive voltage to terminal P (the input terminal for the first grid of tube 5) for directing the computer to subtract $b$ from $a$. Signal "P" (a positive potential) represents the instruction suitable for this case. If $a$ is to be subtracted from $b$, then signal "Q" (a positive potential) will be applied at terminal Q (the input terminal for the first grid of tube 8). If the computer is to perform an operation of addition, the P and Q terminals will both be at low potential and sufficiently low to block tubes 5 and 8 respectively.

Consider now the case of addition ($a+b$). A branch circuit from terminal $a$ is connected to the suppressor grid of tube 5. Likewise, another branch circuit is connected from terminal $b$ to the suppressor grid of tube 8. Since terminals P and Q are both negative for addition, tubes 5 and 8 will be blocked. Their screen grids, however, will be high. This causes companion tubes 6 and 7 to have high first grid potentials so that they will be responsive to signals applied respectively to their suppressor grids. The suppressor grid of tube 6 is connected to the voltage divider in the screen grid circuit of tube 1, whereas the suppressor grid of tube 7 is connected to the voltage divider in the screen grid circuit of tube 2.

Now the screen grid potentials in tubes 1 and 2 reflect the inversion of high or low potentials as applied to their first grids. It follows that when $a=1$, the suppressor grid potential in tube 5 will be H and in tube 6 will be L. Likewise, when $b=1$ the suppressor grid in tube 8 will be H and in tube 7 will be L.

*The generation of carry signals*

Output carry signals are generated whenever two or more of the digits $a$, $b$ and $c$ have the value 1, also whenever a tens carry arises within a 4-place binary representation of a decimal digit. The tens carry will be explained presently. The following tabulation shows carry requirements for addition when $a$, $b$ and $c$ only are considered, digit $c$ being an input carry signal represented by a high potential on conductor 63.

| $a$ | $b$ | $c$ | P | Q | Tubes | | | | Leads | | | Tubes | | | K′ |
|---|---|---|---|---|---|---|---|---|---|---|---|---|---|---|---|
| | | | | | 5 | 6 | 7 | 8 | 59 | 60 | 63 | 9 | 10 | 11 | |
| 1 | 1 | 0 | L | L | — | — | — | — | H | H | L | — | X | — | L |
| 1 | 0 | 1 | L | L | — | — | X | — | H | L | H | — | — | X | L |
| 0 | 1 | 1 | L | L | — | X | — | — | L | H | H | X | — | — | L |
| 1 | 1 | 1 | L | L | — | — | — | — | H | H | H | X | X | X | L |

It could be shown that no other combination of $a$, $b$ and $c$ will produce a carry if the problem is one of addition. The anodes of tubes 9, 10, 11 and 12 are interconnected and have in their output circuits a common voltage divider. Junction point K′ on this divider has a low potential (L) if any one or more of tubes 9, 10, 11 and 12 is driven conductive to represent an outgoing carry signal.

The following tabulation shows conditions under which a carry is generated when the problem is one of subtraction. In these cases the value of instruction signal "P" is high (H) if $b$ is to be subtracted from $a$ and "Q" is high (H) if $a$ is to be subtracted from $b$.

| | $a$ | $b$ | $c$ | P | Q | 5 | 6 | 7 | 8 | 59 | 60 | 63 | 9 | 10 | 11 | K′ |
|---|---|---|---|---|---|---|---|---|---|---|---|---|---|---|---|---|
| $a-b$ | 0 | 1 | 0 | H | L | — | — | — | — | H | H | L | — | X | — | L |
| | 0 | 0 | 1 | H | L | — | — | X | — | H | L | H | — | — | X | L |
| | 0 | 1 | 1 | H | L | — | — | — | — | H | H | H | X | X | X | L |
| | 1 | 1 | 1 | H | L | X | — | — | — | L | H | H | X | — | — | L |
| $b-a$ | 1 | 0 | 0 | L | H | — | — | — | — | H | H | L | — | X | — | L |
| | 0 | 0 | 1 | L | H | — | X | — | — | L | H | H | X | — | — | L |
| | 1 | 0 | 1 | L | H | — | — | — | — | H | H | H | X | X | X | L |
| | 1 | 1 | 1 | L | H | — | — | — | X | H | L | H | — | — | X | L |

In subtractive operations, no combinations of *a*, *b* and *c* will produce a carry other than as shown above. It will be particularly noted, however, that in any case where one of the tubes 5, 6, 7 or 8 is constantly blocked by the presence of a high potential on one or the other terminals P or Q, this situation leaves only the tubes that are unblocked in that manner to be made sensitive to the value of the *a* signal or the *b* signal as the case may be. The unblocked tube in certain cases responds to the *a* signal or the *b* signal directly, that is, without inversion, and in certain other cases it responds to the inversion of the *a* signal or the *b* signal as derived from the potentials on conductors *a'* and *b'*.

*The storage of carries*

What has been said in the preceding chapter makes it clear that when an outgoing carry is generated by the values of *a*, *b* and *c*, the junction point K' on the output circuit voltage divider common to tubes 9, 10, 11 and 12 is low. Junction point K' is connected to delay circuit 55 consisting of a series-connected resistor and capacitor leading to ground. This delay circuit has a connection to the first grid of tube 13 which is a gate tube. The suppressor grid of tube 13 has a connection to the source of A-pulses previously mentioned as being those which provide gating of signals at clock times and which intervene between intervals of storage. It will be remembered that spaces separate the times of storage of signals representing summations and carries for different orders of binary digits as well as for different orders of decimal digits. It follows that when a signal is presented to the voltage divider having junction point K', the effect of this signal will be delayed in its application to storage until the next succeeding A-pulse is supplied to the suppressor grid of tube 13. This A-pulse renders the tube conductive if K' is a high potential; otherwise, tube 13 remains blocked.

In order to store a carry signal, junction point K' must be at low potential. So the delayed signal supplied to tube 13 maintains this tube blocked during the gating pulse time. The result is to maintain the screen grid potential high in tube 13. The voltage divider to which the screen grid is connected has a connection to the first grid of tube 14. This is also a gating tube, the suppressor grid of which is supplied with the A-pulse simultaneously with the application thereof to tube 13. Tube 14 is, therefore, enabled to function in the inverse manner in respect to tube 13 at gating pulse time. In the case of a carry signal to be stored, tube 14 is driven conductive because both its first and third grids are positive. This conductive state, as can readily be seen from the circuit connection to the control grid of tube 15, causes tube 15 to be blocked. The high anode potential in tube 15 causes tube 15' to be driven conductive. The mutually interacting tubes 15 and 15' will be readily recognized as constituting a flip flop. In practice the two triodes are usually enclosed in a single envelope.

If there were no carry requirement, K' would be high. Tube 13 would be driven conductive at A-pulse time. The low anode potential of tube 13 would cause triode 15' to be blocked. The cross connections between the anode circuit of triode 15' and the control grid of triode 15 would cause this triode to be conductive. This is the state necessary for storage of no carry.

Conductor 62 is connected to the voltage divider for the anode circuit common to tubes 14 and 15'. Conductor 62 is therefore maintained at low potential in the presence of a stored carry. Conductor 63 is connected to the voltage divider for the anode circuit common to tubes 13 and 15. Tube 15, as stated above, stores a carry signal by being maintained non-conductive; hence, the potential on conductor 63 is high as an indication of a carry signal where $c=1$. Conductor 63 is a control circuit common to tubes 4, 9 and 11, and its potential when high and when coincident with other high control potentials applied to these tubes has the proper effect both to yield an altered sum signal $\sigma$ as in the case of tube 4, and to generate an outgoing carry signal, as in the case of tubes 9 and 11. This has been fully explained in preceding chapters.

*Generation of the tens carry*

A tens carry signal is generated under certain coincident conditions, including the presence of a negative potential on either or both of conductors 65 and 66. That condition is effective only at $t_8$ time, and the tens carry is generated only by positive potentials applied to both of the control grids of tube 12. Conductors 65 and 66 carry signals *x'* and *y'* respectively from the Shift Register (group III) to control grids of tube 28 and block same. The $t_8$ time pulse is positive and is inverted in tube 75, the output from which controls tube 29. The anodes of tubes 28 and 29 have a common voltage divider circuit connected between +100 v. and −100 v. source terminals. A high potential on conductor 67 will occur, therefore, only when tubes 28 and 29 are both blocked.

Tube 12, although included in group IV (Fig. 1), is electrically associated with tubes 9, 10, 11 of group I, since their anodes are interconnected, and all carry-out signals K' from the "First Binary Adder" are generated and used internally of that sub-assembly. When tube 12 is conductive, it has the same effect as any of the other tubes 9, 10, and 11 whose anodes are all joined together. Thus any one or more of these tubes, if conductive, will produce a low potential at junction point K', as is required for storing a carry signal.

In the chapter headed "The shift register," the requirements of the system for determining a tens carry were explained briefly. It was stated to be the function of the shift register to make digits $2^1$, $2^2$ available at an instant when digit $2^3$ is presented to the input terminals of the computer. These three digits, when summated, would show instances when there is a tens carry to be passed from one 4-digit group to another. Thus, it will be clear from that description how the signals *x'* and *y'* are developed for the purposes set forth in the foregoing part of this chapter. It is only when the summation of $2^1+2^2+2^3$ as binary digits is equal to or greater than decimal 10 that a tens carry is generated. This matter was further explained in the chapter headed "The theory of carry operations." It is now in order to explain in more detail how the shift register cooperates with other components to generate the tens carry signal and the accompanying e-pulse which represents a correction of the tentative sum $\sigma$. If no correction were applied when a tens carry occurs, the lower order of a decimal digit representation would lose the quantity 16 while the value of the carry to the next higher order would amount to only 10. The value of *e*, if it exists, is always 6, the difference between 16 and 10. In the 4-place binary group, the value 6 is represented by the binary number 0110.

The shift register comprises three stages. Each stage is composed of two pentode puller tubes and a trigger pair, usually a twin triode tube, used for storage. The input circuits for these stages include delay circuits such as 56, 57, and 58. The signals entering the first stage are delayed by delay circuits 56 sufficiently so that an advance pulse applied at terminals A will gate any input signals into the trigger circuit where it becomes stored until the next succeeding A-pulse. These A-pulses produce the gating steps so that the digit signals may be transferred from stage to stage in the shift register and finally fed out over output circuits *d* and *d'* after three periods of delay. The three stages of the shift register provide concurrent storage for three binary digits.

The output from the first switching group where the tentative sum is accumulated has been called $\sigma$. It is conveyed to the shift register tube 17 through conductor 53. The inversion of this signal is called $\sigma'$. It is obtained from a voltage divider in the screen grid circuit of tube 12. The inversion may be readily understood when it is seen that conductor 53 is connected to the first grid of tube 12. The signal $\sigma$ is a positive pulse which drives the screen grid potential negative, thus delivering a negative pulse over conductor 54 to the input circuit of tube 16.

It will be apparent that the potentials of $\sigma$ and $\sigma'$ are mutually opposed. Thus, when a positive pulse is applied to the first grid of tube 17, there will at the same time be an application of a negative potential to the first grid of tube 16. Whichever one of these tubes is rendered conductive at the time of applying an advance pulse A, that tube will have a low anode potential to be applied to the control grid of one triode in the associated trigger pair. Assume then that $\sigma=1$. Tube 17 is conductive; tube 18 is biased to cut-off and its high anode potential drives triode 18' conductive. These are the conditions for storing the digit 1 in the first stage of the shift register. If $\sigma=0$, then $\sigma'$ will have a high potential to be applied to the first grid of tube 16. When this tube is gated by an A-pulse, it will become conductive and its low anode potential will block the triode 18'. This in turn will cause the triode 18 to become conductive, which state represents the storage of the digit 0 in the first stage of the shift register.

The three stages of the shift register are concatenated, and yet the gating of information into all three stages is coincident because the flip-flop circuits are all set by the A-pulses as applied to the associated gating tubes. The impedance of the delay circuits is such as to maintain a needed time separation between a signal that issues from a given storage flip-flop and a signal which is stored therein immediately thereafter. The transfer operation from the first stage to the second is typical and an explanation thereof will suffice also for the transfer from the second to the third stage.

One only of the capacitors in the delay circuits 57 becomes charged below ground potential by connection of its upper electrode to the anode circuit voltage divider of a conductive triode 18 or 18'. The other delay circuit 57 stands with substantially no charge so that the connected first grid of tube 19 or 20 is enabled to respond to the next A-pulse. In this way three binary digits can be simultaneously held in storage in the three stages of the shift register by introducing them successively through conductors 53 and 54.

As previously stated, the sensing of requirements for a tens carry takes place at $t_8$ time. At this time, a 4-place binary digit representation of a decimal digit is available or is stored in the shift register as follows:

| $\sigma$ | First Stage | Second Stage | Third Stage |
|---|---|---|---|
| $2^3=8$ | $2^2=4$ | $2^1=2$ | $2^0=1$ |

If digit 1 for $2^2$ is stored in the first stage of the shift register, conductor 65 will have a low potential. This will be applied to suppressor grid of pentode tube 28 and cause the tube to be blocked. In the same manner, if the digit 1 for $2^1$ is stored in the second stage of the shift register, conductor 66 will be low and will be effective on the first grid of tube 28 to block this tube regardless of the value of $2^2$.

*Generation of the six-correction signal e*

The need for applying a correction to the tentative sum whenever a tens-carry is generated has already been discussed. In order to effect the correction, the value 6 must be added if the problem is one of addition, and must be subtracted if the problem is one of subtraction. In either case, the signal $e$ is generated if, and only if, the tens carry is concurrent, and must in that case be made available from the start of $t_1$ time until the end of $t_2$ time. These are the pulse intervals during which the delayed tentative sum digits $2^1$ and $2^2$ are introduced into the final binary adder, group VII.

The decimal value 6 is represented by the binary number 0110. The timing of the effectiveness of signal $e$ is under "turn on" control by tube 30, and under "turn-off" control by tube 25. The presence of the tens carry is indicated by a high potential on conductor 64 at $t_1$ time. Upon coincidence of this high potential with the conductive state in tube 30 (inverter tube 31 being consequently blocked) tube 26 will be driven conductive. This, in turn, causes triode 27 to be blocked and triode 27' to conduct. Thus the signal $e$ is stored in flip-flop 27, 27' for two pulse periods, ending at the beginning of time $t_4$.

*Utilization of the correction pulse e*

The conductor $e$ which is connected to the voltage divider on the output circuit common to tubes 25 and 27 leads to the first grid of tube 32. The inversion of $e$ is called $e'$ and its conductor is connected to the voltage divider in the anode circuit common to tubes 26 and 27'. This conductor $e'$ has connections to the first grid in each of tubes 33 and 40. Tube 33 is of group VII, the final binary adder, and cooperates with tubes 32, 34 and 35 for obtaining the final sum or difference S. Tube 40 is of the same group VII and functions to determine carry requirements arising in the correction process.

*The integration of the delayed tentative sum d with the correction signal e, and with a carry-in signal $\gamma$*

Conductor $d$ carries a high potential pulse to the first grids of tubes 35 and 36 respectively if signal $d=1$. This would be when triode 24 is blocked and holds digit 1 in storage. At the same time, conductor $d'$ would carry a low potential. When digit 0 is held in storage, triode 24' is blocked and delivers a high potential pulse through conductor $d'$ to the suppressor grids of tubes 34 and 38 respectively.

Tubes 32, 33, 34, and 35 have the function of producing a summation of $d$, $e$ and $\gamma$, where $\gamma$ represents the value of any carry coming out of a lower digital order. Tubes 36 and 38 serve to invert $d$ for determination of outgoing subtractive carries and to cause $d$ itself to be used for outgoing additive carries. The summation process will next be explained, however.

Tubes 32 and 33 are used to integrate $e+\gamma=\psi$. Thus, $\psi$ represents the sum of the correction factor $e$ and the incoming carry. Signal $\psi$ on conductor 71 leading to the first grid of tube 34 is low if $e$ differs from $\gamma$, that is, if $\psi=1$. In this case, tube 34 is blocked and its high screen grid potential provides control of the suppressor grid potential in tube 35 so as to render the latter responsive to the potential of signal $d$ applied to its first grid.

If $e=\gamma$, then $e+\gamma=0$. In this case, tubes 32 and 33 are both blocked and signal $\psi$ is high, which renders tube 34 responsive to the potential of signal $d'$ applied to its first grid. Tubes 34 and 35 cooperate in the same manner as tubes 3 and 4. The final sum $S=1$ is represented by a high potential on their common output conductor if both tubes are blocked. $S=0$ if either one or the other of tubes 34 and 35 is conductive. All possible combinations of signals applied to tubes 32, 33, 34 and 35 will yield summation results which may be tabulated as follows:

| $d$ | $e$ | $\gamma$ | 32 | 33 | $\psi$ | 34 | 35 | Output S |
|---|---|---|---|---|---|---|---|---|
| H | H | H | ½ | — | H | ½ | ½ | H |
| H | H | L | X | — | L | — | X | L |
| H | L | H | — | X | L | — | X | L |
| H | L | L | — | ½ | H | ½ | ½ | H |
| L | H | H | ½ | — | H | X | — | L |
| L | H | L | X | — | L | — | — | H |
| L | L | H | — | X | L | — | — | H |
| L | L | L | — | ½ | H | X | — | L |

In the above table, H and L mean high and low signal potentials respectively, X shows a fully conductive tube, ½ shows a tube conductive only to the screen grid, and — is a tube completely blocked.

*The generation of carrys incident to the correction process*

The tabulation given in the preceding chapter holds good both for addition and subtraction. The generation of carrys incident to the correction process depends, however, upon whether the computation is one of addition or subtraction. The control of the carry determination, therefore, takes into consideration the instructions that are given to the computer. Furthermore, it makes no difference in the correction process whether $b$ is to be subtracted from $a$ or $a$ from $b$.

It will be recalled that instruction signals P and Q are applied at terminals P and Q respectively whenever a problem in subtraction is to be solved. The inverted potential of P is represented as $p'$. The inversion of Q is $q'$. In the absence of both P and Q, high potential will be applied on conductors $p'$ and $q'$ respectively. In Fig. 3 it is shown how the P signal is inverted in tube 5 and how the Q signal is inverted in tube 8. The first and third grids in tube 37 are controlled by these signals $p'$ and $q'$ and will render tube 37 conductive whenever the instructions are to add. If either of the signals $p'$ or $q'$ is negative, tube 37 will be blocked and, its anode potential being high, will cause a high signal to be impressed on its output circuit 61.

For addition, the carry determination depends upon making tube 36 receptive to variations of signal potentials on its first grid. This is because tube 38 remains blocked and its high screen grid holds the suppressor grid in tube 36 high. The first grid of tube 36 has a connection to conductor $d$ and is, therefore, driven conductive when the output signal from the shift register is high. This yields a low signal potential on conductor 73 which is called $\delta'$. It gives partial control to pentode tube 39. The other control of this tube is derived from conductor 72 which carries signal $\psi'$, which is the inversion of $\psi$.

Pentode tube 40 is subject to joint control by signals $e'$ and $\gamma'$ where $e'$ is an inversion of the $e$ signal and $\gamma'$ is the inversion of the carryout signal. These inversions are preferred to the signals $e$ and $\gamma$ because of the convenience of blocking tube 40 instead of rendering it conductive in order to represent a carry signal development. Tube 41 is a triode which is subject to control by a timing pulse $t_4$. The purpose of tube 41 is to hold the common output circuit for the three tubes 39, 40, and 41 at low potential during time $t_4$ in order to suppress a carry signal if it were to be developed then. Suppression is required at the time of integrating the highest order digits in the 4-place binary group because any existing tens carry has already been taken care of in the tens carry generator, group IV. It may be said here in explanation of the carry process now under consideration that these carries arise solely on account of the integration of the signals $d$ and $e$. Furthermore, this integration process concerns only the digits $2^1$ and $2^2$ until carries inherent in this integration may arise and be transferred to the digit places $2^2$ and $2^3$.

The following tabulation will show high and low potentials for different input signals and the variations in potentials of conductors 72 and 73 for all possible cases of addition and subtraction. Also shown is the conductive state in each of the tubes 39 and 40 where a hyphen (-)=$a$ blocked state and X=$a$ conductive state. Furthermore, the derivation of the outgoing carry signal Γ is given. The incoming carry signal $\gamma$ is shown in this tabulation and refers to the potential on conductor 70 which is connected to the voltage divider in the common anode circuit for tubes 43 and 44'.

[Addition (conductor 61 is L and 36 is responsive to $d$).]

| $d$ | $e$ | $\gamma$ | 72 | 73 | 39 | 40 | Γ |
|---|---|---|---|---|---|---|---|
| H | H | H | L | L | — | — | H |
| H | H | L | H | L | — | — | H |
| H | L | H | H | L | — | — | H |
| H | L | L | L | L | — | X | L |
| L | H | H | L | H | — | — | H |
| L | H | L | H | H | X | — | L |
| L | L | H | H | H | X | — | L |
| L | L | L | L | H | — | X | L |

[Subtraction (conductor 61 is H and 38 is responsive to $d'$).]

| $d$ | $e$ | $\gamma$ | 72 | 73 | 39 | 40 | Γ |
|---|---|---|---|---|---|---|---|
| H | H | H | L | H | — | — | H |
| H | H | L | H | H | X | — | L |
| H | L | H | H | H | X | — | L |
| H | L | L | L | H | — | X | L |
| L | H | H | L | L | — | — | H |
| L | H | L | H | L | — | — | H |
| L | L | H | H | L | — | — | H |
| L | L | L | L | L | — | X | L |

*The timing of operations*

The various functions performed by different portions of the circuit arrangement and the time relations between the performance of these functions is best described in reference to Fig. 5. This is a timing chart in which there are shown on different horizontal lines the entry and storage of signals in different storage units. The time scale for this diagram is shown at the top where the A-pulses for gating purposes are indicated by small squares, 1, 2, 3, 4, 1', 2', 3', 4', 1'', 2'', etc. The storage times $t_1$, $t_2$, $t_4$, $t_8$, etc., are almost contiguous. Their separations are bridged by the gating pulse times. In the diagram, no attempt has been made to show the relative duration of a gating pulse time and of a storage time. The A-pulses are of the order of a very few microseconds, whereas storage times may be as long as 100 microseconds. When flip-flop tubes are triggered in the early part of an advance pulse time they may require a time interval greater than that of the A-pulse to settle into the new stable state.

The entry of digits $a$ and $b$ at terminals $a$ and $b$ is indicated on the two horizontal lines appearing first under the time scale. The figures on these lines denote the decimal digit value of each pulse of a 4-place binary digit group. The line $c$ shows carry digits which may be derived from lower orders and are applied to the first grid of tube 4 for the summation, also to grids of tubes 9 and 11 for meeting possible further carry requirements. A carry is indicated by a conductive state in any one or more of tubes 9, 10, 11 and 12. To indicate no carry, all these tubes must be blocked. The voltage divider common to their anode circuits has a junction point K' at which the carry ($c=1$) is a low potential. Delay circuit 55 functions to obtain a delayed signal transfer from junction point K' to the flip-flop circuit 15, 15' at any of the A-pulse times by the gating operation in tube 13 or 14. The arrows crossing the horizontal line 55 represent the transfer.

The integration of signals $a$, $b$, and $c$ has been described above as signal $\sigma$ entering the shift register through conductor 53, provided that digit 1 is indicated. If digit 0 is indicated then signal $\sigma'$ (the inversion of $\sigma$) is transmitted through conductor 54. In either case, the storage of the digit in flip-flop 18 is delayed by the delay circuits 56. Along the horizontal line which is referenced 56 in Fig. 5 are diagonally disposed arrows indicating the times of transfer. The signal stored in flip-flop 18 is called $x$.

When $\sigma$ represents digit $2^1$ it, of course, follows digit $2^0$ and is entered into the flip-flop 18 in quick succession to the departure therefrom of the digit $2^0$. The time separation is that which is provided by delay circuits 56 and 57. When the digit $2^0$ becomes stored in flip-flop 21, digit $2^1$ at the same time becomes stored in flip-flop 18. Likewise, when digit $2^0$ has been transferred to flip-flop 24 after delay produced by delay circuit 58, the shift register then contains three digits, $2^0$, $2^1$ and $2^2$. Digit $2^3$ has, at the same time, been applied at terminals $a$ and $b$. It will thus be seen that there is a precession of the storage of digits in the shift register such that when the 4-place binary representation of a decimal digit has been received by the computer, the digit $2^0$ becomes stored during $t_8$ time according to the clock time intervals shown at the head of Fig. 5.

The programming is then continued for purposes of correction. The correction operations are required only when there is a tens carry. Nevertheless, the operations proceed whether or not there is such a corrective requirement. If a tens carry occurs it will be generated by rendering tube 12 conductive as hereinabove described. This tens carry signal appears as a negative potential at junction point K′ and sets the flip-flop 15 so as to deliver a positive pulse on conductor 64. This, in turn, renders tube 26 conductive as soon as the clock pulse time $t_1$ occurs (coincident with an A pulse) and operates tube 30 for driving it conductive at A-pulse time 1′. Assuming that the tens carry did occur, tube 26 will then perform a gating operation and will set triode tube 27 to a non-conductive state. Triode 27′ will, of course, be triggered into conduction. It maintains the storage of the tens carry. This storage, however, is now given the significance of signal $e$ which performs the necessary correction function by controlling tube 32 for a new summation. At the same time, the inversion of $e$, called $e'$, is used to control tubes 33 and 40 so as to provide proper correction of the tentative sum whenever the tens carry occurs and to avoid corrective steps otherwise.

In Fig. 5 the lines referring to tubes 28 and 29 show that during $t_8$ time these tubes are enabled to play their part in the determination of the tens carry. The timing is under control of tube 75, and the functioning of the tubes has already been explained.

The conductive or non-conductive state in tube 37 is under control of instruction signals $p'$ and $q'$. Fig. 5 indicates that the condition of tube 37 remains set one way or the other throughout the solving of any single problem.

The timing of controls by which the tubes of groups IV, V, VI and VII are enabled to deliver the true sum S is indicated by the last few horizontal lines of Fig. 5. The Final Binary Adder, group VII includes two sets of tubes as indicated in Fig. 1 where the block representing group VII shows tubes 32 to 35 inclusive for obtaining the final sum S and tubes 39 to 44 inclusive for obtaining carries Γ which are incident to the corrective process.

The final carries Γ may be generated during $t_1$ time and/or $t_2$ time. Occasionally a carry may occur at $t_4$ time but in that case it has no significance and is voided by a conductive state in tube 41. The significant final carries are thus confined within a given 4-place binary group to which they are appropriate.

The time scale of Fig. 5 and the several horizontal lines which are labeled according to the decimal values of the respective binary digits give one an idea of the progression of these digits from one to another storage element. Transfers are obtained at A-pulse times and with the aid of delay circuits. The sloping arrows in Fig. 5 represent transfers. The delay circuits which separate the storage of one digit from a succeeding digit are specified by reference number on the same horizontal line with corresponding sloped arrows for transfers.

*Conclusion*

The scope of this invention will be recognized by those skilled in the art to be such that its principles of operation may be expanded to cover the use of code element permutations other than those which conform strictly to the binary system. There are several different code arrangements from which a suitable one may be chosen to meet the requirements of an adder-subtractor. Furthermore, the generation of tens-carries and the utilization thereof in the decimal system is merely illustrative of similar carry operations which would be involved when the 4-element codes represent an ordinal digit of a numerical system having any radix greater than 2. In the English monetary system, for example, the summation of $a+b$ in terms of pence and in excess of 11 pence calls for an outgoing carry to an ordinal digit of shillings denomination. The principles of 12-carry generation and utilization are obviously the same as those of the tens-carry herein set forth. If a 12-carry is called for and the code elements are binary digits, then the correction factor would be 4 instead of 6. Other correction factors may be utilized as required in order to take care of computations in which the code combinations represent digits of any numerical counting system.

The foregoing description is believed to be sufficiently detailed and explicit to enable anyone skilled in the art to practice my invention. I have not deemed it necessary to explain how the input signals are obtained nor how the output signals are utilized since various well known devices and methods may be considered applicable, as is well known in the art. The given pulse trains may be of any length up to the limits of an associated memory device. The rate of input of the digit signal may be varied over a wide range.

While I have described a circuit arrangement which is suitable for the performance of computations in addition and subtraction, using binary digits which have decimal digit significance when grouped as 4-place binary numbers, it will be understood by those skilled in the art that various changes and modifications of the circuit arrangement may be made without departing from the spirit of the invention. What is believed to be novel is indicated in the claims to follow.

I claim:

1. An electronic serial add-subtract computer wherein the binary digits 0 and 1 are represented by signals of opposite polarity, and operable upon entries of binary coded decimals and yielding results wherein the maximum value of each 4-place binary number is nine, said computer comprising an arithmetic element receptive of signal representation of simultaneously presented binary digits of like denominational order and serially presented binary digits of ascending orders as well as carry signals, a control circuit receptive of instruction signals to add or to subtract and to designate the minuend if subtraction is wanted, a carry means arranged to produce said carry signals to effect in said arithmetic element, carries from one to another of the four places within a binary coded decimal sum digit, and from the highest place of one 4-place sum digit to the lowest place of the next higher order digit, said carry means operating differentially under influence of said control circuit, a multi-stage flip-flop register into which representations of binary sum digits from the arithmetic element are progressively entered and stored until replaced by others, means for simultaneously determining the values of the binary sum digits $2^3$, $2^2$ and $2^1$ when the representations of the digits $2^1$ and $2^2$ have been stored in said register and the representation of the digit $2^3$ is about to be stored therein, and effective to initiate an operation of said carry means to produce a carry signal which effects in said arithmetic element, a carry to the lowest place of the next higher order 4-place sum digit when a carry requirement exists, and means for correcting the 4-place binary numbers composed of said sum digit representations whenever a carry to the lowest place of the next higher order binary number has occurred so as to obtain a result in which each 4-place binary number represents a single decimal digit.

2. In an electronic digital computer wherein the binary digits 0 and 1 are represented by pulses of opposite polarity, a basic circuit arrangement constituted as a serial adder-subtractor, for obtaining a signal representation of a tentative sum or difference of 4-place binary digit representations of decimal digits simultaneously applied thereto in the form of signals and including means for producing signals to effect sixteens carries between 4-place decimal digit representations, a tens-carry signal generator operable whenever a given 4-place binary tentative sum or difference representation has a value greater than 9, means controlled by the tens-carry signal generator and the sixteens carry effecting means for generating signals representative of a correction factor, and a secondary circuit arrangement constituted as a serial adder-subtractor controlled by the correction factor signals and the tentative sum representations, whereby a true sum or difference is obtained in the form of serially deliverable binary digit signals in the binary coded decimal system.

3. In an electronic computer, a serial adder-subtractor receptive to trains of signals composed of 4-binary-element codes each representing an ordinal digit of a numerical system having a radix greater than 2, and including signal combining means for summating simultaneously presented code elements to produce signals representative of tentative sums or differences, carry signal generating means operable when the summated code elements indicate a binary carry requirement, a delay circuit and storage means for causing the presentation of carry signals to the adder-subtractor for inclusion in a higher order code element summation, an ordinal-carry signal generator having its output applied to the delay circuit, controlling means for said generator automatically operable to determine carry requirements where a given 4-element tentative sum or difference code has a value greater than that of any ordinal digit, a circuit controlled by the outputs from said delay circuit which effect carries to the lowest order elements of four element codes and effective to introduce signals representative of a correction factor into the computing process, and means for combining the correction factor signals with the tentative sum or difference signals to produce a signal train, the code elements of which are successively delivered and are grouped as 4-element representations or ordinal digits giving the true sum or difference of the summation, all 4-element codes so delivered having a value no greater than that of any ordinal digit.

4. The invention according to claim 3 and including a separate input circuit to the first recited combining means for each of two digit signal trains *a* and *b* to be introduced into the adder-subtractor and other input circuit arrangements adapted to instruct the adder-subtractor to add or subtract, and when subtracting to choose between obtaining the difference $a-b$ or $b-a$, said other input circuit arrangements effecting differential operations of the binary carry signal generating means.

5. The invention according to claim 3 wherein the controlling means includes a shift register operable to receive and to temporarily store a succession of signals representing tentative sums or differences of different code element orders, said shift register having its output connected to the means for combining the correction factor with the tentative sums or differences, and means for sensing the states of a plurality of stages of the shift register at predetermined times.

6. In an electronic computer of the type which deals serially with binary coded decimals represented by groups of signals, one per binary digit, an arithmetic element for obtaining a signal representation of a tentative sum of a pair of such numbers, a multi-stage shift register through which the tentative sum representation is stepped comprising a flip-flop circuit in each stage, a tens-carry signal generator for said arithmetic element, means for producing a signal representative of a coded decimal correction factor, an arithmetic element for obtaining a summation of the tentative sum and said correction factor under control of the representations of both as the representation of the former emerges from the shift register, means responsive to periodic pulses for controlling said shift register, the last said means including for each stage, a time constant network and coincidence gate pullers for the flip-flop, jointly operable to effect stage-to-stage transfers of information as represented by said flip-flop circuits, but only when enabled to do so by said periodic pulses, and means periodically operative to determine the concurrent values of the binary digits of a coded decimal tentative sum, representations of certain of which are stored in said shift register, for controlling the operations of said tens-carry generator and of said correction factor signal producing means.

7. In a serial adder-subtractor for producing the sum or difference of two simultaneously presented binary coded decimal numbers, the coded decimal and binary digits of which are presented serially in ascending order, and wherein the binary digits 0 and 1 are represented by signals of opposite polarity, the combination of an input circuit controlled by the simultaneously presented binary digit signals for said numbers and a signal representative of a carry from lower order to produce a signal representation of a tentative sum, means controlled by the input circuit for producing said carry signal instruction circuits for effecting differential operation of the carry signal producing means for addition and subtraction, and when the latter, in accordance with which number is the minuend, means for detecting a decimal equivalency of ten or greater in the tentative sum or difference of each pair of coded decimal digits as exhibited by the signal representations thereof, said detecting means operating said carry means to produce a carry signal for application to the input means along with signal representations of the lowest order binary digits of the next higher order coded decimal digits, means operable by the carry means whenever the latter is operated by the detecting means, to generate a signal representative of a coded decimal correction digit, an output circuit controlled by the binary digit signals of the tentative sum and of the correction digit and by signals representative of carries from lower orders to produce a signal representation of the coded decimal sum or difference of the input numbers, means controlled by the output circuit for producing the carry signals which control the latter, and instruction circuits for effecting differential operation of the last said carry means for addition and subtraction.

8. In a serial electronic adder-subtractor for obtaining the sum or difference of two simultaneously applied numbers, each represented by serial binary code signals which are grouped according to another code of greater radix to represent digits of said other code, a first binary adder-subtractor circuit to which like order signals for both numbers and carry signals are applied simultaneously, said circuit producing binary code signals indicative of a tentative sum or difference of the numbers, means for producing said carry signals to effect carries in said circuit according to the binary code and also according to said other code, means controlled by the carry effecting means for generating signals representative of a correction factor only when the carry effecting means produces a carry signal for application to the adder-subtractor circuit simultaneously with the lowest order binary signals of two groups, and a second adder-subtractor circuit to which the tentative sum and correction factor signals are applied, said circuit producing binary code signals grouped according to said other code and representative of the sum or difference of the said two numbers.

9. The combination according to claim 8 wherein the carry effecting means includes a time delay device receptive of a carry signal on application to the first adder-subtractor circuit of a pair of binary code signals and adapted to apply a carry signal to said circuit simultaneously with the application thereto of the pair of binary code signals of next higher order, and coincidence detection means controlled by the first adder-subtractor circuit and the output of the time delay device and effective to apply the carry signals to the time delay device.

10. The combination according to claim 9 and including a multi-stage shift register through which the tentative sum or difference signals are stepped to the second adder-subtractor circuit, means for sensing the states of a plurality of stages of the shift register simultaneously with the application to the first adder-subtractor circuit of the highest order pair of binary signals of two groups, and a coincidence detector controlled by the first adder-subtractor circuit and said sensing means and effective to apply carry signals to said time delay device.

11. The combination according to claim 10 wherein the second adder-subtractor includes means for effecting binary carries, and including operation control means for effecting differential operation of the second adder-subtractor carry means and the coincidence detection means of the first adder-subtractor for addition and subtraction and when the latter in accord with *a—b* or *b—a* where *a* and *b* are the two simultaneously applied numbers.

12. The combination according to claim 11 and including means for disabling the second adder-subtractor carry means to prevent carries to the lowest order binary place of each group.

References Cited in the file of this patent

UNITED STATES PATENTS

| | | |
|---|---|---|
| 2,364,540 | Luhn | Dec. 5, 1944 |
| 2,404,047 | Flory | July 16, 1946 |
| 2,409,689 | Morton | Oct. 22, 1946 |
| 2,428,811 | Rajchman | Oct. 14, 1947 |
| 2,435,841 | Morton | Feb. 10, 1948 |
| 2,490,500 | Young | Dec. 6, 1949 |
| 2,558,447 | MacSorley | June 26, 1951 |

OTHER REFERENCES

Electrical Engineering, "The Binary Quantizer," by Barney (pages 962–966), November 1949.

Electronic Engineering, "An Electronic Digital Computer," by A. D. Booth (pages 492–498), December 1950.

"High Speed Computing Devices," 1950, by Engineering Research Associates (ERA), McGraw-Hill Book Company, pages 289 to 293, 5 sheets.

UNITED STATES PATENT OFFICE

CERTIFICATE OF CORRECTION

Patent No. 2,872,107 February 3, 1959

William H. Burkhart

It is hereby certified that error appears in the printed specification of the above numbered patent requiring correction and that the said Letters Patent should read as corrected below.

Column 1, line 29, for "signal" read -- single --; column 5, line 59, before "for" insert -- and --; column 16, line 29, for "signal" read -- signals --; line 47, for "representation" read -- representations --.

Signed and sealed this 23rd day of June 1959.

(SEAL)

Attest:

KARL H. AXLINE
Attesting Officer

ROBERT C. WATSON
Commissioner of Patents